US006584300B2

United States Patent
Lengua

(10) Patent No.: US 6,584,300 B2
(45) Date of Patent: Jun. 24, 2003

(54) OBJECT-ORIENTED SYSTEM FOR SIMULATING SONAR TARGET ACOUSTIC SCATTERING

(75) Inventor: Gabriel A. Lengua, San Diego, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 158 days.

(21) Appl. No.: 09/796,812

(22) Filed: Feb. 28, 2001

(65) Prior Publication Data

US 2003/0013069 A1 Jan. 16, 2003

(51) Int. Cl.[7] .................................................. G09B 9/00
(52) U.S. Cl. ............................ 434/6; 434/118; 434/219
(58) Field of Search ......................... 434/6, 118, 219; 702/190

(56) References Cited

U.S. PATENT DOCUMENTS

| | | |
|---|---|---|
| 5,274,572 A | 12/1993 | O'Neill et al. |
| 5,392,225 A | 2/1995 | Ward |
| 5,903,473 A | 5/1999 | Kuperman et al. |
| 5,907,706 A | 5/1999 | Brodsky et al. |
| 5,960,097 A | 9/1999 | Pfeiffer et al. |
| 5,983,067 A | 11/1999 | Weinberg |
| 5,987,242 A | 11/1999 | Bentley et al. |
| 6,296,489 B1 * | 10/2001 | Blass et al. .................. 434/185 |
| 6,442,104 B1 * | 8/2002 | Ridgell et al. ................. 367/1 |
| 6,453,273 B1 * | 9/2002 | Qian et al. ................... 702/190 |

* cited by examiner

*Primary Examiner*—Joe H. Cheng
*Assistant Examiner*—John L. Sotomayor
(74) *Attorney, Agent, or Firm*—Michael A. Kagan; James A. Ward; Peter A. Lipovsky

(57) ABSTRACT

A detailed sonar target scattering simulation system using object-oriented techniques to implement a broadband computational simulation of a plurality of detailed target highlight features. The class library includes a target class and a highlight base class from which a plurality of highlight subclasses are drawn to accurately represent a wide range of target highlight features. The resulting standard high-level framework allows many operations to be naturally defined and used with reduced software code errors, thereby improving computational effectiveness. The system includes a data processor, a user interface for accepting user commands and data, a display for displaying the simulated acoustic received signal, and a data memory for storing information representing the properties of the acoustic source signal and the positions of the acoustic source signal, the acoustic received signal and the target, and a class library including a target class, a highlight base class and one or more highlight subclasses.

12 Claims, 7 Drawing Sheets

| OBJECT CLASS STRUCTURE TABLE | | | |
|---|---|---|---|
| TARGET | | | |
| BASIC HIGHLIGHT | COVERED HIGHLIGHT | SPECULAR HIGHLIGHT | SPHERE |
| | | | HYPER-ELLIPSE |
| | | | PETAL |
| | | | NACA |
| | | CYLINDER | |
| | | PLATE | |
| | | CONE | |
| | | EDGE | |
| | | CORNER | |
| | | TANK | |
| | | RIB OR INTERACTING RIBS (S) | |
| | | CURVATURE DISCONTINUITY | |
| | PROPELLER | | |
| | MEMBRANE WAVES (S) | | |
| | CREEPING WAVES | | |
| COATING | | | |

FIG. 6

| INTERACTION CLASS STRUCTURE TABLE | | |
|---|---|---|
| PARSE | COATING_PARSE | |
| | HIGHLIGHT_PARSE | |
| HIGHLIGHTLIST_OPERATIONS | GET_HIGHLIGHTLIST | |
| | SET_HIGHLIGHTLIST | |
| | DELETE_HIGHLIGHTLIST | |
| INITIALIZE | COATING_INITIALIZATION | |
| | HIGHLIGHT_INITIALIZATION | |
| RUN | HIGHLIGHT_ECHO | HIGHLIGHT_RESPONSE |

FIG. 7

| INTERACTION CLASS STRUCTURE TABLE (FOR BASIC HIGHLIGHT) | | |
|---|---|---|
| PARSE | | |
| INITIALIZE | | |
| FLASHPOINT_CALCULATION | CHECK_SHADING | |
| AMPLITUDE_CALCULATION | CHECK_SHADING | |
| | CALCULATE_GEOMETRICAL_FACTOR | |
| | CALCULATE_PHASE_CANCELLATION_FACTOR | |
| | CALCULATE_REFLECTIVITY_FACTOR | |

FIG. 8

| INTERACTION CLASS STRUCTURE TABLE (FOR COVERED HIGHLIGHT) | |
|---|---|
| CALCULATE_PENETRATIONANGLES | |
| CALCULATE_LOSS | |

FIG. 9

| INTERACTION CLASS STRUCTURE TABLE (FOR SPECULAR HIGHLIGHT) | CALCULATE_NORMAL |
|---|---|
| SPECULARPOINT_SEARCH | CALCULATE_BISECTOR |
| CALCULATE_CURVATURE | |

FIG. 10

| INTERACTION CLASS STRUCTURE TABLE (FOR COATING) | |
|---|---|
| PARSE | |
| INITIALIZE | |

FIG. 11

OBJECT-ORIENTED SYSTEM FOR SIMULATING SONAR TARGET ACOUSTIC SCATTERING

FEDERALLY-SPONSORED RESEARCH AND DEVELOPMENT

The present invention is assigned to the United States Government and is available for licensing for commercial purposes. Licensing and technical inquiries should be directed to the Office of Patent Counsel, Space and Naval Warfare Systems Center, San Diego, Code D0012, San Diego, Calif., 92152; telephone (619)553-3001, facsimile (619)553-3821.

BACKGROUND OF THE INVENTION

1. Field of the Invention

This invention relates generally to object-oriented sonar system simulators and more particularly to an object-oriented system for simulating bistatic sonar target acoustic scattering behavior.

2. Description of the Related Art

Active and passive sonar systems are well-known. An active sonar system generally includes a transmitter and acoustic transducer that produces an acoustic source signal, creating a scattering and propagating wave front. A receiving transducer array detects a received acoustic signal representing the incidence of a reflected portion of the source signal wave front. Passive sonar systems consist substantially of the receiving transducer array and the target object becomes the transmitter of the acoustic source signal in the form of noise from the target object or transmissions from other active sonar devices.

Accurate target models capable of predicting the echo time history of submarines and surface ships are essential tools for antisubmarine warfare and ship vulnerability studies. A realistic model must account for the many highlights of a target, the conditions of insonification, and the proper highlight amplitude and phase to predict temporal and spectral behavior. The physical scattering mechanisms must be properly identified and incorporated into the model.

Over the past thirty years, practitioners in the sonar system arts have steadily improved the Uniform Theory of Diffraction (UTD) target model, which have proven to be an invaluable asset for the development of torpedo and surveillance systems signal processing algorithms and simulations. Previous formulations of the UTD target models, dictated by the computational limitations of past simulation systems have been limited to monostatic and far-field configurations for narrowband applications. They also were limited to a simple Doppler implementation. These restrictions simplified the numerical implementation (and theoretical development) considerably and they serve well in deep-water and other benign environments. However, in the littoral environment now paramount in the military and geopolitical milieu, more sophistication is required.

Numerous practitioners have proposed improvement to the sonar modeling art intended to accommodate the special problems of the littoral environment. For instance, in U.S. Pat. No. 5,983,067, Weinberg discloses a system for simulating the features of a multipath sonar system, such as reverberation, lofargrams, autocorrelation coefficients and cross-correlation coefficients in a littoral environment. However, Weinberg relies on eigenray simulation and neither considers nor suggests means for accommodating the computational complexity of a detailed sonar target scattering model.

The strong need in the art for improved broadband modeling has prompted the development of broadband target models of high fidelity. See, for instance G. A. Lengua, "Frequency Dependencies of Target Highlights," *NRaD Technical Report* 1752, Naval Command, Control, and Ocean Surveillance Center, San Diego, Calif., August 1997. These have served as invaluable simulation tools. However, the significant multipath structure of littoral environments requires bistatic target models of high fidelity, which impose major computational burdens on existing simulation systems. Practical considerations demand computational efficiency but existing simulation techniques are not robust enough to handle the complexity arising from including bistatic response of target highlights with sophisticated Doppler and broadband implementation.

These unresolved problems and deficiencies are clearly felt in the art and are solved by this invention in the manner described below.

SUMMARY OF THE INVENTION

This invention resolves the above-described detailed sonar target scattering model computational complexity problem by introducing for the first time an object-oriented target scattering simulation system.

It is a purpose of this invention to provide a new implementation of a detailed sonar target scattering model made possible for the first time by using object-oriented techniques to implement the broadband computational simulation of a plurality of detailed target highlight features. It is a feature of this invention that the class library includes a new target class and a new highlight base class from which a plurality of highlight subclasses are drawn to represent a wide range of target highlight features. It is an advantage of this invention that the resulting standard high-level framework allows many operations to be naturally defined and used with reduced software code errors, thereby improving computational effectiveness.

In one aspect, the invention is a machine-implemented method of simulating an acoustic received signal arising from an acoustic source signal scattered by a target having a plurality of highlights, the method comprising the unordered steps of storing in a data memory information representing the properties of the acoustic source signal, storing in the data memory information representing medium properties selected from the group that includes velocity, density, and scattering properties, storing in the data memory information representing the geometric relationship of the simulated positions of an acoustic source, an acoustic receiver, and the target, storing in the data memory a class library including a target class having a plurality of methods, a highlight base class and one or more highlight subclasses each having a plurality of methods, instantiating from the stored class library a target object representing the target, instantiating from the stored class library a highlight object representing one or more of the target highlights, executing a plurality of the methods in the target and highlight objects to predict the simulated acoustic received signal, and displaying the simulated acoustic received signal.

In a preferred embodiment, the invention is a system for simulating an acoustic received signal arising from an acoustic source signal scattered by a target having a plurality of highlights, the system comprising a data processor; a user interface coupled to the data processor for accepting user commands and data; a data memory coupled to the data processor for storing information and executable processor instructions, including information representing the properties of the acoustic source signal, information representing medium propagation properties selected from the group that includes velocity, density, and scattering properties, information representing the geometric relationship of the simulated positions of an acoustic source, an acoustic receiver, and the target, a class library including a target class having a plurality of methods, a highlight base class and one or more highlight subclasses each having a plurality of methods, program means for instantiating from the stored class library a target object representing the target, program means for instantiating from the stored class library a highlight object representing one or more of the target highlights, and program means for executing a plurality of the methods in the target and highlight objects to predict the simulated acoustic received signal; and a display coupled to the data processor for displaying the simulated acoustic received signal.

In yet another aspect, the invention is a computer program product for use with a system for simulating an acoustic received signal arising from an acoustic source signal scattered by a target having a plurality of highlights, the system including a data memory and a display device, the computer program product including a recording medium on which are recorded program means for directing the system to store in the data memory information representing the properties of the acoustic source signal, program means for directing the system to store in the data memory information representing medium properties selected from the group that includes velocity, density, and scattering properties, program means for directing the system to store in the data memory information representing the geometric relationship of the simulated positions of an acoustic source, an acoustic receiver, and the target, program means for directing the system to store in the data memory a class library including a target class having a plurality of methods, a highlight base class and one or more highlight subclasses each having a plurality of methods, program means for directing the system to instantiate from the stored class library a target object representing the target, program means for directing the system to instantiate from the stored class library a highlight object representing one or more of the target highlights, program means for directing the system to execute a plurality of the methods in the target and highlight objects to predict the simulated acoustic received signal, and program means for directing the system to display on the display device the simulated acoustic received signal.

The foregoing, together with other objects, features and advantages of this invention, can be better appreciated with reference to the following specification, claims and the accompanying drawing.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein:

FIG. 6 is an object class structure table illustrating the class hierarchy in an exemplary embodiment of the class library of this invention;

FIG. 7 is an interaction class structure table illustrating the flow of functions (methods) in an exemplary embodiment of the Target Class of this invention;

FIG. 8 is an interaction class structure table illustrating the flow of functions (methods) in an exemplary embodiment of the Highlight Base Class of this invention;

FIG. 9 is an interaction class structure table illustrating the flow of functions (methods) in an exemplary embodiment of the Covered Highlight Subclass of this invention;

FIG. 10 is an interaction class structure table illustrating the flow of functions (methods) in an exemplary embodiment of the Specular Highlight Subclass of this invention; and FIG. 11 is an interaction class structure table illustrating the flow of functions (methods) in an exemplary embodiment of the Coating Base Class of this invention.

DESCRIPTION OF THE PREFERRED EMBODIMENT

Object-Oriented Programming Techniques

Figure 1:
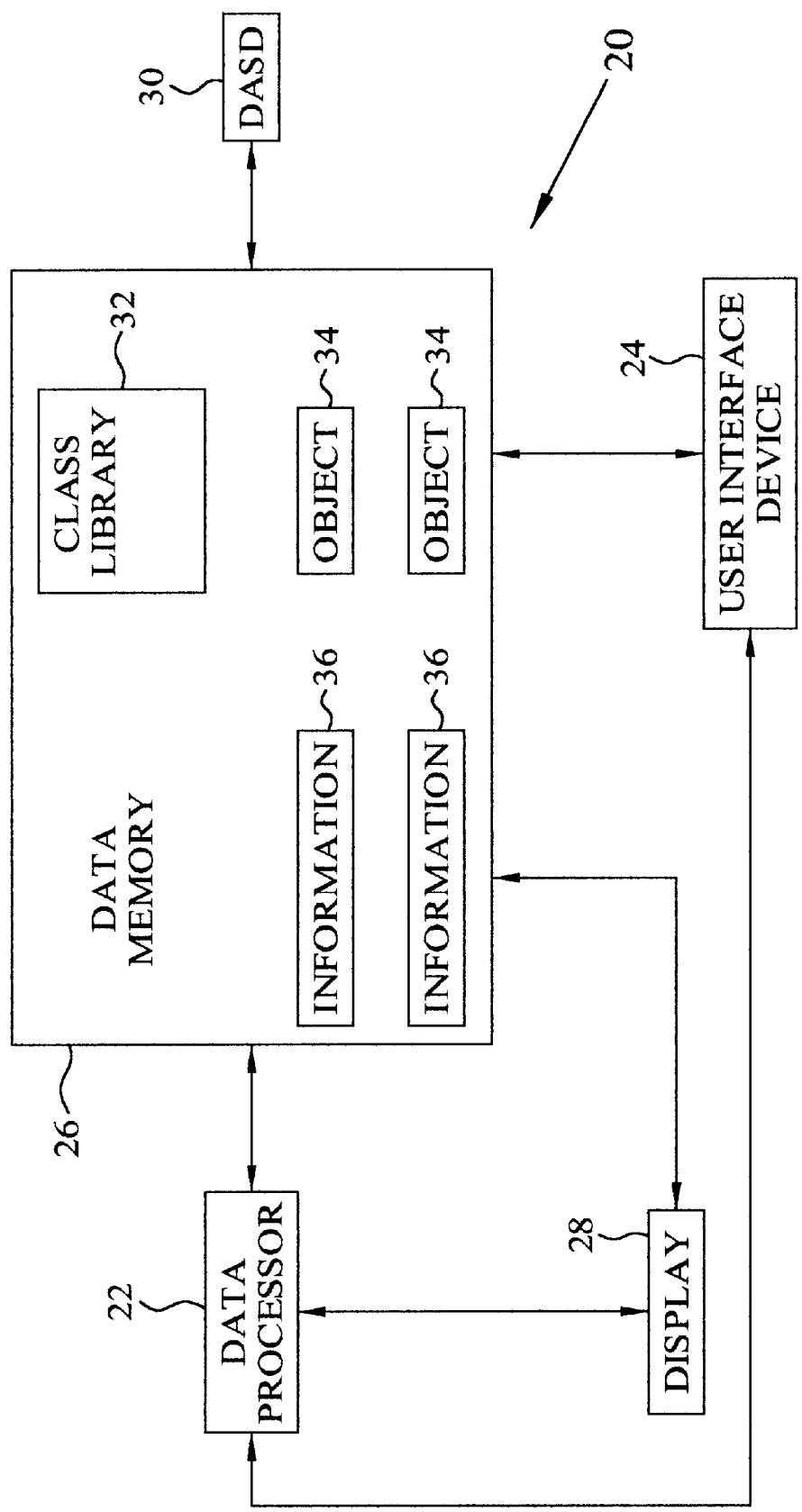
FIG. 1 is a block diagram illustration of an exemplary embodiment of the system of this invention.

In a preferred embodiment, the invention is implemented in the C++ programming language using object-oriented programming techniques. C++ is a compiled language, that is, programs are written in a human-readable script and this script is then provided to another program denominated a compiler, which generates a machine-readable binary code that can be loaded into, and directly executed by, a computer. As described below, the C++ language has certain characteristics that allow a software developer to easily use programs written by others while still providing a great deal of control over the reuse of programs to prevent their destruction or improper use. The C++ language is well-known and many articles and texts are available which describe the language in detail. In addition, C++ compilers are commercially available from several vendors including Borland International, Inc. and Microsoft Corporation. Accordingly, for reasons of clarity, the details of the C++ language and the operation of the C++ compiler will not be discussed further herein.

As is understood by those skilled in the art, object-oriented programming techniques involve the definition, creation, use and destruction off "objects." These objects are software entities embracing information ("data elements") and routines or functions ("methods"), which manipulate the data elements. The data and related methods are treated as a single entity and can be created, used and deleted as such. Together, the data and methods enable objects to model virtually any real-world entity in terms of its characteristics, which are represented by the data elements, and its behaviors, which are represented by its data manipulation functions or methods. In this way, objects can model concrete things such as targets and people, and they can also model abstract concepts such as numbers and geometrical designs.

As is well-known in the software arts, objects are defined by creating "classes," which are not objects themselves, but which act as templates that instruct the compiler how to construct an actual object. A class may, for example, specify the number and type of data variables and the steps involved in the methods that manipulate the data. An object is actually created ("instantiated") in the program by means of a special class method called a "constructor," which uses the corresponding class definition and additional information, such as arguments provided during object creation, to construct the object. Similarly, objects are destroyed by a special class method called a "destructor." Objects are used by the system through the use of their data and the invocation of their methods. In the C++ language, objects can be created either at compile time or at runtime.

The benefits of object technology arise out of the three basic well-known principles of encapsulation, polymorphism and inheritance. Encapsulation means that objects are designed to hide, or encapsulate, some or all of the internal data structure and the internal methods. More particularly, during program design, a program developer defines objects in which all or some of the data variables and all or some of the related methods are considered "private" or for use only by the object itself. Other data or methods are declared "public" or available for use by other programs. Access to the private variables by other programs is controlled by defining public methods for an object through which all other objects are obliged to access the object's private data. The public methods form a controlled and consistent interface between the private data and the "outside" world. Instead of exposing their implementation details, objects present interfaces that represent their abstractions cleanly with no extraneous information. Any attempt to write program code that directly accesses the private variables causes the object-oriented compiler to generate an error during program compilation, which stops the compilation process and prevents the program from being run. This enforces the encapsulation principle of object-oriented programming.

Polymorphism is the principle that allows objects and methods having the same overall format to function differently with different data while producing consistent results. Polymorphism provides many different shapes having the same interface. A software component can make a named 1 request of another component without any knowledge of the other component other than the name of the request. The component that receives the request interprets it and determines, according to its (hidden or exposed) methods and data, how to execute the request. For example, an addition function may be defined as variable A plus variable B (A+B) and this same format can be used whether the A and B are numbers, characters or dollars and cents. However, the actual program code that performs the addition function may differ from component to component, depending on the type of variables that make up A and B. Polymorphism allows separate new method definitions to be written (e.g., for numbers, characters or dollars) to which an earlier program can later refer by its common format (A+B) with no knowledge of the method details. During compilation, the C++ compiler determines which of the three methods is actually being used by examining the variable types. The compiler then substitutes the proper method code. Thus, the polymorphism principle allows similar new methods that produce analogous results to be "grouped" as subclass variations in the program source code to enforce a logical program flow without modifying other program elements.

The third principle underlying object-oriented programming is inheritance, which allows program developers to easily reuse pre-existing class code instead of creating all new software from scratch. The inheritance principle allows a software developer to declare classes (and the objects later created from them) as related. Specifically, classes may be designated as subclasses of other base classes. A subclass "inherits" and has access to all of the public methods of its base classes just as if these method appeared in the subclass. Alternatively, a subclass can override some or all of its inherited methods or may modify some or all of its inherited methods merely by defining a new method with the same form (by polymorphism, overriding or modification does not alter the method in the base class, but merely modifies the use of the method in the subclass). The creation of a new subclass having some or all of the functionality (with selective modification) of another class allows software developers to easily customize a well-defined portion of the existing code to meet particular needs without concern for the effects on other code.

The Simulation System

FIG. 1 is a block diagram showing a simulation system 20, including a data processor 22, a user interface device 24 for accepting user commands and data inputs, a data memory 26, and a display 28. Data memory 26 is coupled to an external direct access storage device (DASD) 30 that provides a nonvolatile store for binary data, which may be transferred from and to data memory 26 under control of data processor 22 in the well-known manner. Such binary data may include executable processor instructions making up program means for performing functions and methods according to the features of this invention. For example, a class library 32 may be stored in data memory 26 from which a plurality of software objects exemplified by the objects 34 may be instantiated under program control and stored elsewhere in data memory 26. Similarly, various information files exemplified by the information files 36 may be transferred from DASD 30 and/or user interface device 24 (or some other suitable external source) into data memory 26 for use by the program means within objects 34.

Figure 2:
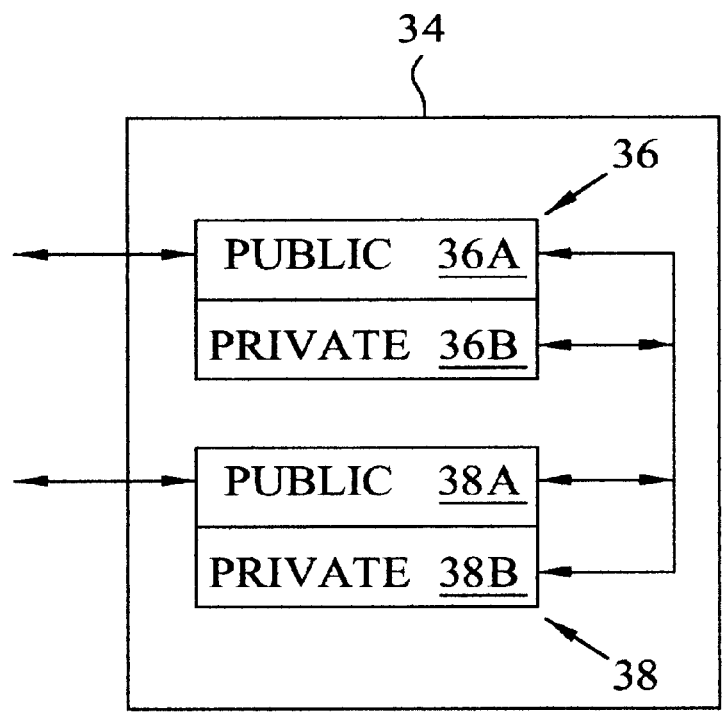
FIG. 2 is a block diagram illustrating the features of an object from the prior art.

FIG. 2 is a block diagram showing the typical internal features of an exemplary object instance 34 from the prior art. Using the corresponding class as a template, object 34 is created ("instantiated") in data memory 26 under the control of a creator method (not shown) within the parent class. Object 34 includes the encapsulated data 36 and the encapsulated functions ("methods") 38. Data 36 includes the public data 36A, which are directly accessible by ("exposed to") other objects in data memory 26, and the private data 36B, which are hidden from all other objects in data memory 26. Similarly, methods 38 includes the public methods 38A, which are directly accessible and callable ("invocable") by other objects in data memory 26, and the private methods 38B, which are hidden from all other objects in data memory 26. Of course, all data 36 and methods 38 are available to one another within the confines of object 34.

Figure 3:
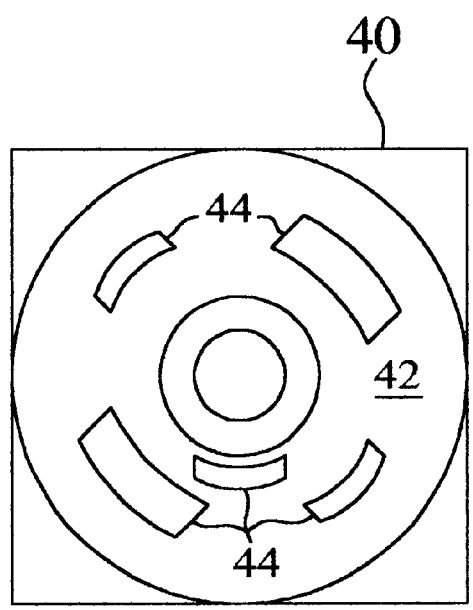
FIG. 3 is a schematic illustration of an exemplary embodiment of the computer program product of this invention.

FIG. 3 is a schematic illustration of a computer program product 40 of this invention. In the exemplary embodiment shown, computer program product 40 includes a recording medium 42 on which are recorded a plurality of program means exemplified by the program means 44 consisting mainly of machine-readable binary data representing executable processor instructions making up program means for performing functions and methods according to the features of this invention. In operation, user interface device 24 is disposed to accept computer program product 40 for reading of the recorded data, which may be transferred to data memory 26 under the control of data processor 22 in a well-known manner.

Figure 4:
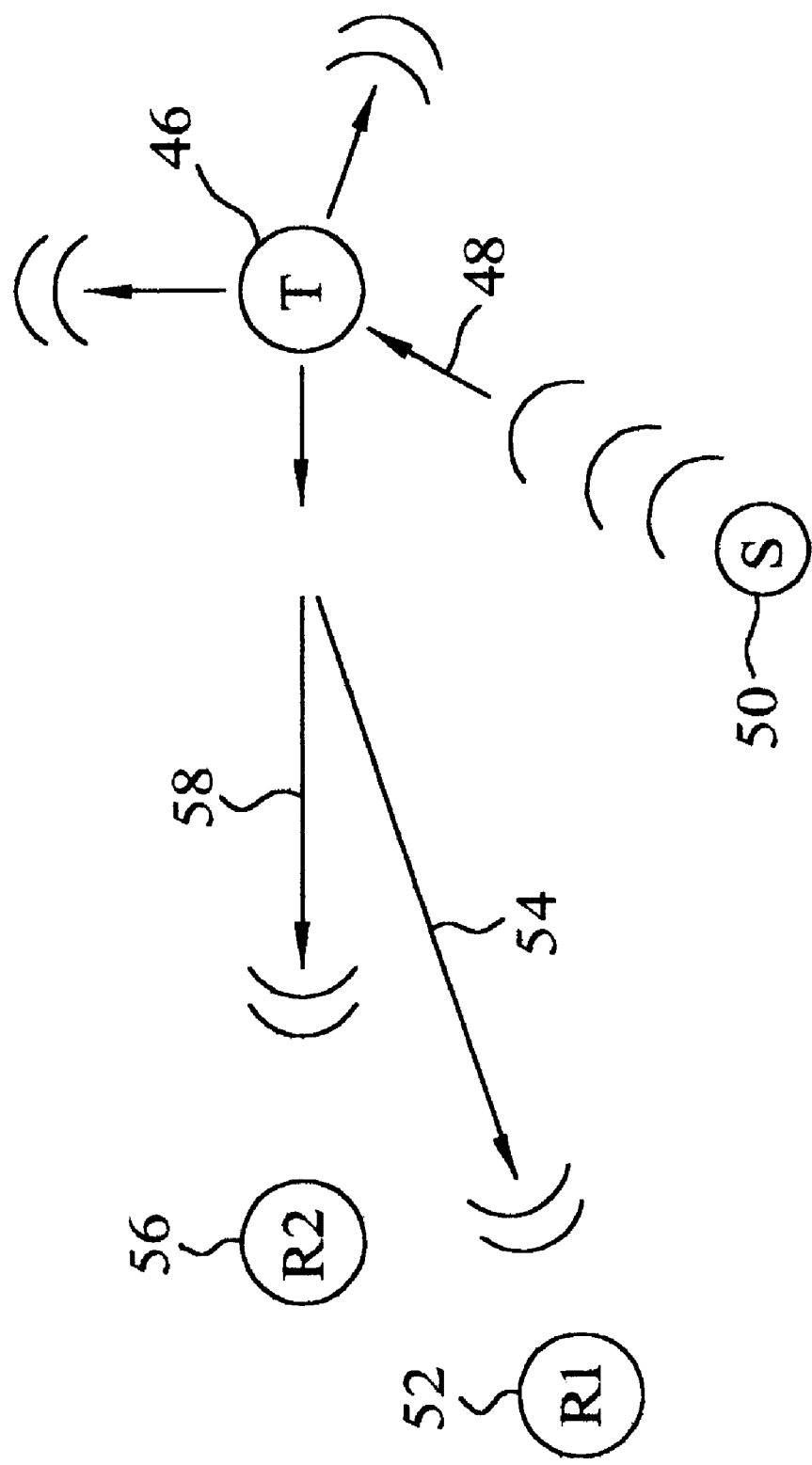
FIG. 4 is a schematic illustration of exemplary bilateral source, target and receiver geometries suitable for simulation by the system of this invention.

FIG. 4 is a schematic illustration of exemplary bilateral source, target and receiver geometries suitable for simulation by the system of this invention. A "target model" is a representation used to predict the echo ("acoustic received signal") observed at a receiver arising from the scattering from a target of an acoustic signal transmitted by a source ("acoustic source signal"). In FIG. 4, a target 46 is disposed to scatter an acoustic source signal 48 arriving from a remote acoustic source 50. A first receiver 52 is disposed remotely to receive an acoustic received signal 54 consisting of some portion of the acoustic energy scattered from target 46. For purposes of exposition, a second receiver 56 is shown as disposed remotely from receiver 52 and target 46 to receive another acoustic received signal 58 consisting of some different portion of the acoustic energy scattered from target 46. Because acoustic source 50 and acoustic receiver 52 are not collocated, the geometry is denominate a bistatic geometry and the exact properties of received acoustic signal 54 are determined by the geometrical relationship of receiver 52, target 46 and source 50, as well as the detailed acoustic properties of target 46 and source acoustic signal 48. While the simulation of these bistatic geometrical relationships is easily tractable, the detailed effects of the acoustic properties of target 46 are very demanding, as mentioned above. This may be better appreciated with reference to an exemplary target submarine 60 (FIG. 5).

Figure 5:
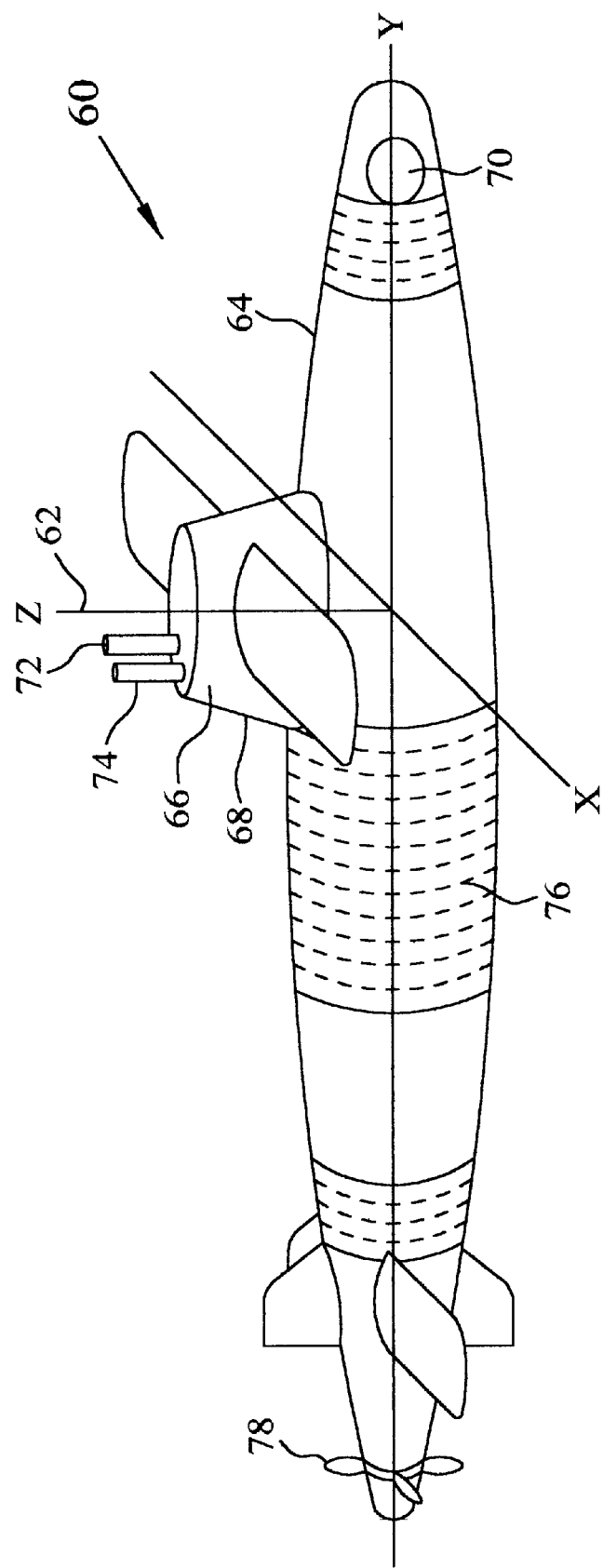
FIG. 5 is a schematic illustration of the decomposition of an exemplary simulated submarine target into exemplary embodiment of the highlight features of this invention.

FIG. 5 is a schematic illustration of exemplary simulated submarine target 60 into exemplary embodiment of the highlight features of this invention. Along with the source signal properties such as duration, waveform, frequency, and the like, and the medium propagation properties such as sound velocity, density, and distance, the scattering properties of target 60 substantially affect the acoustic received signals that are to be simulated. Target 60 is broken down into a set of discrete scatterers, herein denominated "highlights." For example, in FIG. 5, a plurality of highlight features are shown at various locations with respect to a three-dimensional coordinate system 62. These include an outer hull specular scatterer 64, a sail specular scatterer 66, a sail edge scatterer 68, a sonar ball covered scatterer 70, the periscope specular scatterers 72 and 74, a plurality of rib covered scatterers exemplified by the rib scatterer 76, and a propeller scatterer 78. Note that a highlight may be "covered" by another highlight, such as sonar ball 70 covered within outer hull 64 and that a highlight may be "shaded" by another highlight depending on the direction of the receiver, such as the far side of outer hull 64 viewed from the near side. Also, any highlight may be "coated" to modify its acoustic properties, such as the addition of an anechoic coating material on the scatterer. The overall target echo is represented as the sum of all individual highlight echoes for the particular source signal, propagation medium and source-target-receiver geometry under simulation.

The Class Library

FIG. 6 is an object class structure table illustrating the class hierarchy in an exemplary embodiment of the class library of this invention. The format follows the IEEE P15616.2 standard except that some private methods may be shown as well. FIG. 6 shows the class hierarchy from left to right. Thus, for example, a Sphere subclass is derived from a Covered Highlight class, which in turn is derived from a Highlight base class. The [S] notation denominates a class specific to sonar applications. Accordingly, special classes may be established for other highlights such as periscope 74 or propeller 78 (FIG. 5) in accordance with this invention by merely decomposing the highlight into basic geometrical elements, subclassing the Highlight class and adding one or two special methods to accommodate the features of each of the basic geometrical elements. The interaction of the many object instances during runtime then automatically accommodates the interactions among the many different target elements. Examples of such special highlight subclasses include Cone, Comer, Edge, Cylinder, Petal, Plate, and the like. The class library of this invention includes numerous such highlight subclasses drawn to idealized simulation formulas to reduce the computational complexity of the overall simulation.

The Target Class

FIG. 7 is an interaction class structure table illustrating the flow of functions (methods) in an exemplary embodiment of the Target Class of this invention. The format follows the IEEE P15616.2 standard except that some private methods may be shown as well. The Target Class is the user interface, which makes use of the other classes transparently to the user. General information may, for example, include identification, gross size, and version. In turn, each highlight is described, for example, in terms of its relative location, shape parameters, material properties, shading parameters, coating (if any), and cover (if any). In turn, each coating is described in terms of, for example, its material properties. The outputs include complex amplitude (magnitude and phase, for example), relative time delay, and Doppler (Scale, when broadband) for each highlight. The amplitude information represents a transfer function representing a depiction in the frequency domain, for example.

In FIG. 7, the functions performed flow from top to bottom and left to right. Thus, for example, Run makes use of Highlight_Echo, which makes use of the response function of the various highlight subclasses. Use of the Target Class is straightforward. The Target Class transparently instantiates a target object, which assembles and processes simulation data that may be described as inputs and outputs for purposes of this description. The inputs include information describing the transmitted signal properties and the source-target-receiver geometry. Information describing a "blueprint" of the target is also provided in the form of general information and lists of highlights and coatings. For example, given a pointer to file, Parse loads a blueprint information file into an internal data list and signals success or failure. Initialize prepares for operation based on the operational conditions defined for the simulation, such as may be included in an environmental information file. Run then computes and outputs the response for each highlight (amplitude, time delay and Doppler). The HighlightList_ Operations method provides an option to select the highlight models actually used.

The following Table 1 provides a C++ header file defining an exemplary embodiment of the Target Class suitable for use with this invention.

TABLE 1

```
//////////////////////////////////////
// CTarget.h : Declare the CTarget class
//
// Target class for C++
//////////////////////////////////////
#ifndef _C_TARGET_H
#define _C_TARGET_H
//////////////////////////////////////
// Include
//////////////////////////////////////
#include "Simulation.h"
#include "CCoating.h"
//////////////////////////////////////
// Local defines
//////////////////////////////////////
#define NumCoats 10
//////////////////////////////////////
// Class declaration
//////////////////////////////////////
class CTarget
{
```

TABLE 1-continued

```
public:
    CTarget ( void );
    ~CTarget ( );
public:
    SBoatInfo        BoatInfo;                      // General boat data
    SHullCharacter   HullCharacter;                 // Hull character data
    SBlueprint*      pBlueprint;                    // Ptr to blueprint data
    CCoating*        pCoatingData[NumCoats];        // Ptr to coating list
private:
    void*            pOuterHull;                    // Ptr to outer hull
    void*            pSail;                         // Ptr to sail
private:
    CCoating*        GetCoating ( LPSTR pCoatName );
    void*            GetCover ( LPSTR CoverID );
public:
    BOOL             Parse ( FILE* fd );
    int              Initialize ( SEnvironment* pEnvirmt,
                                  SFluids* pDensity,
    SFluids* pVelocity );
    void             Echo ( SGeometry* Navy,
                            int H1Type,
                            void *HiliteData,
SHiliteRecord* Hilite);
    SHiliteRecord* RunSimulation ( SGeometry* pViewPoint,
                                   SEnvironment* pEnvirmt );
    // Functions to allow control of the hilite selection
    SH1Select*       GetHiliteList ( void );
    void             SetHiliteList ( SH1Select* pList );
    void             DelHiliteList ( SH1Select* pList );
};
#endif // _C_TARGET_H
```

The Highlight Base Class

FIG. 8 is an interaction class structure table illustrating the flow of functions (methods) in an exemplary embodiment of the Highlight Base Class of this invention. The format follows the IEEE P15616.2 standard except that some private methods may be shown as well. Highlights are represented in the simulation classes by idealized shapes for mathematical tractability. By decomposing a scatterer into smaller idealized shapes, the actual scattering properties maybe more accurately simulated using tractable analytical functions within a plurality of software objects. This feature of the system of this invention substantially reduces the computational demands of accurate simulation. Examples of such canonical geometrical shapes include the sphere, the cylinder and the plate. Highlights need not be independent and the system of this invention may account for weak interactions between highlights, such as elastic wave coupling. For expository purposes, a brief discussion of the basic highlight math model is now presented.

According to the well-known Primakoff & Keller formulation, (Primakoff et al., "Reflection and Transmission of Sound by Thin, Curved Shells." *Journal of the Acoustical Society of America*, 19, September 1947, pp. 820–832) For a surface, the geometrical factor is $$G = \left[ (r_S + r_R)^2 + 2\cos\theta \left( \frac{1}{R_A} + \frac{1}{R_B} + \frac{\tan^2\theta}{R_{IR}} \right) (r_S + r_R) r_S r_R + \frac{4}{R_A R_B} r_S^2 r_R^2 \right]^{-1/2},$$

where $r_S$ and $r_R$ are the source and receiver ranges, respectively, and $\theta$ is the angle of incidence with respect to the normal). $R_A$ and $R_B$ are the principal radii of curvature. $R_{IR}$ is the radius of curvature in the plane of incidence. If $\phi$ is the polar angle in the plane of incidence $$\frac{1}{R_{IR}} = \frac{1}{R_A}\cos^2\phi + \frac{1}{R_B}\sin^2\phi.$$

Note that, in the monostatic case, $$G = \frac{1}{2r\sqrt{1 + \frac{r}{R_A}}\sqrt{1 + \frac{r}{R_B}}}.$$

The phase-cancellation factor is $$P = P_H P_V$$
$$= \frac{1}{\sqrt{2}}[F_\pm(\chi_{max}) - F_\pm(\chi_{max})]\frac{1}{\sqrt{2}}[F_\pm(\zeta_{max}) - F_\pm(\zeta_{max})]$$

where $$F_\pm(u) = \int_0^u e^{\pm i\frac{\pi}{2}\tau^2} d\tau$$

is the Fresnel integral and the arguments are $$\chi_{max} = \sqrt{\frac{2}{\pi}k\left|\frac{2}{r_S + r_R} - \frac{2}{R_A}\right|} x_{max}$$

$$\chi_{min} = \sqrt{\frac{2}{\pi}k\left|\frac{2}{r_S + r_R} - \frac{2}{R_A}\right|} x_{min}$$

$$\zeta_{max} = \sqrt{\frac{2}{\pi}k\left|\frac{2}{r_S + r_R} - \frac{2}{R_B}\right|} z_{max}$$

$$\zeta_{min} = \sqrt{\frac{2}{\pi}k\left|\frac{2}{r_S + r_R} - \frac{2}{R_B}\right|} x_{min},$$

with k the wavenumber. Now $$F_\pm(u) = C(u) \pm iS(u)$$
$$= \frac{1}{2}(1 \pm i) - [g(u) \pm if(u)]e^{\pm i\frac{\pi}{2}u^2}$$

where f(u) and g(u) are auxiliary functions. These are odd functions and, for $0 \leq u \leq \infty$, have the rational approximations $$f(u) \approx \frac{1 + 0.926 u}{2 + 1.792 u + 3.104 u^2}$$

$$g(u) \approx \frac{1}{2 + 4.142 u + 3.492 u^2 + 6.670 u^3}$$

Alternatively, series representations may be used [Boe60].

The case of a straight side must be treated separately. The observation point will be referenced to mid-height. Let h be the height of the side and $\gamma_S$ and $\gamma_R$ be the orientation angles with respect to the side. In the monostatic case, it can be shown that our earlier definition of $P_V$ may still be used, but with $$z_{max} = r\cos\gamma + \frac{1}{2}h$$

and

-continued $$z_{min} = r\cos\gamma - \frac{1}{2}h.$$

This is equivalent to the result of Skudrzyk et al (E. J. Skudrzyk, et al., "Acoustic Diffractors, Part I—Plane Diffractors and Wedges," ARL-PSU Technical Memorandum 73–109, Applied Research Laboratory—Pennsylvania State University, State College, Pa., May 1973) when $$r >> \frac{kh^2}{2\pi}.$$

Here it may be expressed as $$P_V = \left[\sqrt{\frac{k}{\pi r}}\, he^{-i\frac{\pi}{4}}\right]\left[\frac{\sin(kh\cos\gamma)}{kh\cos\gamma}\right].$$

Note that the first term in brackets is the Sommerfeld-MacDonald factor for effecting the near field to far-field transition [Ruc70]. The second term in brackets is the directivity of a line array.

The bistatic generalization is straightforward $$z_{max} = \frac{1}{2}(r_S\cos\gamma_S + r_R\cos\gamma_S) + \frac{1}{2}h$$

and $$z_{min} = \frac{1}{2}(r_S\cos\gamma_S + r_R\cos\gamma_S) - \frac{1}{2}h.$$

Consider an acoustic wave in medium 3, a fluid (water), incident on medium 2, an elastic plate of thickness d, which in turn is backed by medium 1, a fluid (water or air). The reflection and transmission coefficients are given by [Bre80]

$$R = \frac{(M^2 - N^2)\frac{Z_1}{Z_3} + 1 + iM\left(1 - \frac{Z_1}{Z_3}\right)}{(M^2 - N^2)\frac{Z_1}{Z_3} - 1 - iM\left(1 + \frac{Z_1}{Z_3}\right)}$$

and $$T = \frac{-2iN\frac{Z_1}{Z_3}\frac{\rho_3}{\rho_1}}{(M^2 - N^2)\frac{Z_1}{Z_3} - 1 - iM\left(1 + \frac{Z_1}{Z_3}\right)},$$

where $$M = \frac{Z_{2C}}{Z_3}\cos^2(2\theta_{2S})\cot P + \frac{Z_{2S}}{Z_3}\sin^2(2\theta_{2S})\cot Q$$

$$N = \frac{Z_{2C}}{Z_3}\frac{\cos^2(2\theta_{2S})}{\sin P} + \frac{Z_{2S}}{Z_3}\frac{\sin^2(2\theta_{2S})}{\sin Q}$$

$P = k_{2C}d\cos\theta_{2C}$ $Q = k_{2S}d\cos\theta_{2S}$ $$Z_1 = \frac{\rho_1 c_1}{\cos\theta_1}$$

$$Z_{2C} = \frac{\rho_2 c_{2C}}{\cos\theta_{2C}}$$

$$Z_{2S} = \frac{\rho_2 c_{2S}}{\cos\theta_{2S}}$$

$$Z_3 = \frac{\rho_3 c_3}{\cos\theta_3}$$

$$c_{2C}^2 = \frac{E_2}{\rho_2(1-\sigma_2^2)}$$

$$c_{2S}^2 = \frac{G_2}{\rho_2}$$

and $$G_2 = \frac{E_2}{2(1+\sigma_2)}.$$

Snell's law relates the propagation angles (measured from the normal)

$$k_3\sin\theta_3 = k_{2C}\sin\theta_{2C} = k_{2S}\sin\theta_{2S} = k_1\sin\theta_1.$$

Typical values for steel are $$\rho = 7.8\times 10^3\ \frac{kg}{m^3},\ E = 2.17\times 10^{11}\ \frac{N}{m^2},$$

and $\sigma = 0.284$.

Hence $$c_C = 5501\ \frac{m}{s}\ \text{and}\ c_S = 3291\ \frac{m}{s}.$$

The following Table 2 provides a C++ header file defining an exemplary embodiment of the Highlight Base Class suitable for use with this invention.

TABLE 2

```
//////////////////////////////////////////
// CBasicHilite.h : Declare the CBasicHilite class
//
// Basic hilite class for C++
//////////////////////////////////////////
#ifndef _C_BASIC_HILITE_H
#define _C_BASIC_HILITE_H
//////////////////////////////////////////
// Include
//////////////////////////////////////////
#include "CComplex.h"
#include "C3Vector.h"
#include "CCoating.h"
#include "Simulation.h"
//////////////////////////////////////////
// Class declaration
//////////////////////////////////////////
class CBasicHilite
{
public:
    CBasicHilite( void );
    ~CBasicHilite( );
protected:
    SDyad    Curvature;   // Principal curvatures
    double   XMin;        // Fresnel limits
    double   XMax;
    double   ZMin;
    double   ZMax;
    double   IncAng;      // Angle of incidence
                          //   (wrt normal)
    double   GFactor;     // Geometrical factor
    CComplex PCFactor;    // Phase-cancellation factor
    CComplex RFactor;     // Reflection factor
    CComplex TFactor;     // Transmission factor
```

TABLE 2-continued

```
    CComplex     Level;                // Return level
    C3Vector     FlashPt;               // Flash point
    BOOL         Shaded;
    int          NShadows;              // Number of shadows used.
    SShadow      Shadows [MAXSHADOWS];  // Angular pairs
                                        // between which the
                                        // hilite is shadowed.
public:
    C3Vector     Location;              // Location
    char         CoatingID[MXIDLNG];    // Coating description
    CCoating*    pCoatingSpec;          // Pointer to coating spec
    double       XmtrRange;             // Range to transmitter
    double       RcvrRange;             // Range to receiver
    SEnvironment* pEnviron;             // Pointer to environ data
    SFluids*     pDensity;              // Pointer to fluid density
                                        //    table
    SFluids*     pVelocity;             // Pointer to sound speed
                                        //    table
protected:
    BOOL         Shadowed ( double Aspect,
                            double Elevation,
                            int NShadows,
    SShadow* Shadows );
    CComplex CalculatePCF ( double Xrange,
                            double Rrange,
                            double coef );
    double   CalculateGF ( C3Vector& Xmtr,
                           C3Vector& Rcvr,
                           C3Vector& RefPlane );
    CComplex CalculateRF ( void );
public:
    void         CalculateRT ( double angle,
                               CCoating* coating,
                               double density_in,
    double density_out,
                               double speed_in,
    double speed_out,
                               CComplex& RCoef,
    CComplex& TCoef );
    virtual BOOL Parse ( FILE* fd,
                         LPSTR pKeyBuffer );
    virtual C3Vector FlashSearch ( C3Vector& Source,
                                   C3Vector& Receiver );
    virtual void Amplitude ( C3Vector& Source,
                             C3Vector& Receiver,
                             CComplex* pAmplitude );
};
#endif // _C_BASIC_HILITE_H
```

The Highlight Subclasses

FIG. 9 is an interaction class structure table illustrating the flow of functions (methods) in an exemplary embodiment of the Covered Highlight Subclass of this invention. The format follows the IEEE P15616.2 standard except that some private methods may be shown as well.

Each highlight can be naturally represented by a subclass of a single Highlight Base Class because all highlights have common data (for example, Location, CoatingID, and Environ) and methods (for example, Shadowed and CalculateReflectivity) that may be included in one Highlight Base Class from which the various Highlight subclasses inherit. Thus, any new highlight may be modeled merely by modifying a few specific properties of a new Highlight subclass.

The following Table 3 provides a C++ header file defining an exemplary embodiment of the Covered Highlight Subclass suitable for use with this invention.

TABLE 3

```
//////////////////////////////////////////////////////////
// CCoveredHilite.h : Declare the CCoveredHilite class
//
// Covered hilite class for C++
//////////////////////////////////////////////////////////
#ifndef _C_COVERED_HILITE_H
#define _C_COVERED_HILITE_H
//////////////////////////////////////////////////////////
// Include
//////////////////////////////////////////////////////////
#include "CComplex.h"
#include "C3Vector.h"
#include "CCoating.h"
#include "Simulation.h"
#include "CBasicHilite.h"
//////////////////////////////////////////////////////////
// Class declaration
//////////////////////////////////////////////////////////
class CCoveredHilite : public CBasicHilite
{
public:
    CCoveredHilite( void );
    ~CCoveredHilite( );
protected:
    double       PenAngS;   // Penetration angle wrt source
    double       PenAngR;   // Penetration angle wrt receiver
    CComplex     Loss;      // /Loss factor
public:
    char         CoverID[MXIDLNG]; // Cover description
    void*        pCover;           // Pointer to cover hilite
    CCoating*    pCoverSpec;       // Pointer to cover
                                   //   specification
public:
    void CalculatePenAngs ( C3Vector& Source, C3Vector& Receiver );
    void CalculateLoss ( void );
};
#endif // _C_COVERED_HILITE_H
```

FIG. 10 is an interaction class structure table illustrating the flow of functions (methods) in an exemplary embodiment of the Specular Highlight Subclass of this invention. The format follows the IEEE P15616.2 standard except that some private methods may be shown as well.

The following Table 4 provides a C++ header file defining an exemplary embodiment of the Specular Highlight Subclass suitable for use with this invention.

TABLE 4

```
//////////////////////////////////////////////////////////
// CSpecularHilite.h : Declare the CSpecularHilite class
//
// Specular hilite class for C++
//////////////////////////////////////////////////////////
#ifndef _C_SPECULAR_HILITE_H
#define _C_SPECULAR_HILITE_H
//////////////////////////////////////////////////////////
// Include
//////////////////////////////////////////////////////////
#include "C3Vector.h"
#include "Simulation.h"
#include "CCoveredHilite.h"
//////////////////////////////////////////////////////////
// Class declaration
//////////////////////////////////////////////////////////
class CSpecularHilite : public CCoveredHilite
{
public:
    CSpecularHilite( void );
    ~CSpecularHilite( );
protected:
    C3Vector     Normal;    // Unit normal to surface
    C3Vector     Bisector;  // Unit bisector of Source-Candidate
                            //   and Candidate-Receiver vectors
```

TABLE 4-continued

```
protected:
    virtual C3Vector CalculateNormal ( C3Vector& Point ) = 0;
    virtual C3Vector CalculateBisector ( C3Vector& Source,
                                         C3Vector& Receiver ) = 0;
    virtual SDyad   CalculateCurvature ( C3Vector& Point ) = 0;
public:
    C3Vector FlashSearch ( C3Vector& Source,
                           C3Vector& Receiver );
    virtual C3Vector SpecularSearch ( C3Vector& Source,
                                      C3Vector& Receiver );
};
#endif // _C_SPECULAR_HILITE_H
```

The Coating Base Class

FIG. 11 is an interaction class structure table illustrating the flow of functions (methods) in an exemplary embodiment of the Coating Base Class of this invention. The format follows the IEEE P15616.2 standard except that some private methods may be shown as well.

The following Table 5 provides a C++ header file defining an exemplary embodiment of the Coating Class suitable for use with this invention.

TABLE 5

```
///////////////////////////////////////////////////////////
// CCoating.h : Declare the CCoating class
//
// Coating class for C++
///////////////////////////////////////////////////////////
#ifndef _C_COATING_H
#define _C_COATING_H
///////////////////////////////////////////////////////////
// Include
///////////////////////////////////////////////////////////
#include "CComplex.h"
#include "C3Vector.h"
#include "Simulation.h"
///////////////////////////////////////////
// Local defines
///////////////////////////////////////////
#define MXLYRS    6       // Maximum number of coating layers
///////////////////////////////////////////
// Class declaration
///////////////////////////////////////////
class CCoating
{
public:
        CCoating( void );
        ~CCoating ( );
public:
        char       ID[MXIDLNG];
        int        NumberOfLayers;
        double     Thickness [MXLYRS];
        double     Density [MXLYRS];
        CComplex   LongitudinalSpeed[MXLYRS];
        CComplex   TransverseSpeed[MXLYRS];
        CComplex   NormalRCoef;    // Normal incidence reflection coefficient
        CComplex   NormalTCoef;    // Normal incidence tansmission coefficient
        double     LoadDensity;    // Density of the loading fluid
        double     LoadSpeed;      // Sound speed in the loading fluid
protected:
        double     ShearMod[MXLYRS];
        double     Compress[MXLYRS];
        double     ModConst[MXLYRS];
        double     ModCoef[MXLYRS];
        double     ModExp[MXLYRS];
        double     LossTan[MXLYRS];
        double     PercentAir[MXLYRS];
        double     EffDensity[MXLYRS];
public:
        BOOL       Parse ( FILE* fd, LPSTR pKeyBuffer );
        void       Initialize ( double Pressure, double Frequency );
};
struct SComposition               // Structure compositions.
{
        C3Vector       Location; // Location of start of new composition.
            double         Thickness;
            char           CoatingID[MXIDLNG];
            CCoating*      pCoatingSpec;
            SComposition*  pNext;
};
struct SHullcharacter             // Hydrodynamic hull characteristics
{
            int            NEntries;      // Number of entries
```

TABLE 5-continued

```
    SComposition*  pComposition;  // Hull composition list
};
#endif // _C_COATING_H
```

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

I claim:

1. A machine-implemented method of simulating an acoustic received signal arising from an acoustic source signal scattered by a target having a plurality of highlights, the method comprising the unordered steps of:

storing in a data memory information representing the properties of the acoustic source signal;

storing in the data memory information representing medium propagation properties selected from the group that includes velocity, density, and scattering properties;

storing in the data memory information representing the geometric relationship of the simulated positions of an acoustic source, an acoustic receiver, and the target;

storing in the data memory a class library including a target class having a plurality of methods, a highlight base class and one or more highlight subclasses each having a plurality of methods;

instantiating from the stored class library a target object representing the target;

instantiating from the stored class library a highlight object representing one or more of the target highlights;

executing a plurality of the methods in the target and highlight objects to predict the simulated acoustic received signal; and displaying the simulated acoustic received signal.

2. The method of claim 1 wherein:

the target class includes general boat data, hull character data and methods for calling at least one highlight object representing a target highlight.

3. The method of claim 2 wherein:

the highlight base class includes location data, coating identification data and methods for calculating acoustic reflectivity.

4. A system for simulating an acoustic received signal arising from an acoustic source signal scattered by a target having a plurality of highlights, the system comprising:

a data processor;

a user interface coupled to the data processor for accepting user commands and data;

a data memory coupled to the data processor for storing information and executable processor instructions, including information representing the properties of the acoustic source signal, information representing the geometric relationship of the simulated positions of an acoustic source, an acoustic receiver, and the target, information representing medium propagation properties selected from the group that includes velocity, density, and scattering properties;

a class library including a target class having a plurality of methods, a highlight base class and one or more highlight subclasses each having a plurality of methods, program means for instantiating from the stored class library a target object representing the target, program means for instantiating from the stored class library a highlight object representing one or more of the target highlights, and program means for executing a plurality of the methods in the target and highlight objects to predict the simulated acoustic received signal; and a display coupled to the data processor for displaying the simulated acoustic received signal.

5. The system of claim 4 wherein:

the target class includes general boat data, hull character data and methods for calling at least one highlight object representing a target highlight.

6. The system of claim 5 wherein:

the highlight base class includes location data, coating identification data and methods for calculating acoustic reflectivity.

7. A computer program product for use with a system for simulating an acoustic received signal arising from an acoustic source signal scattered by a target having a plurality of highlights, the system including a data memory and a display device, the computer program product comprising:

a recording medium;

program means, recorded on the recording medium, for directing the system to store in the data memory information representing the properties of the acoustic source signal;

program means, recorded on the recording medium, for directing the system to store in the data memory information representing the geometric relationship of the simulated positions of an acoustic source, an acoustic receiver, and the target;

program means, recorded on the recording medium, for directing the system to store in the data memory information representing medium propagation properties selected from the group that includes velocity, density, and scattering properties;

program means, recorded on the recording medium, for directing the system to store in the data memory a class library including a target class having a plurality of methods, a highlight base class and one or more highlight subclasses each having a plurality of methods;

program means, recorded on the recording medium, for directing the system to instantiate from the stored class library a target object representing the target;

program means, recorded on the recording medium, for directing the system to instantiate from the stored class library a highlight object representing one or more of the target highlights;

program means, recorded on the recording medium, for directing the system to execute a plurality of the methods in the target and highlight objects to predict the simulated acoustic received signal; and program means, recorded on the recording medium, for directing the system to display on the display device the simulated acoustic received signal.

8. The system of claim 6 wherein:

the target class includes general boat data, hull character data and methods for calling, at least one highlight object representing a target highlight.

9. The system of claim 7 wherein:

the highlight base class includes location data, coating identification data and methods for calculating acoustic reflectivity.

10. A machine-implemented method of simulating an acoustic received signal arising from an acoustic source signal scattered by a target having a plurality of highlights, the method comprising the unordered steps of:

storing in a data memory information representing the properties of the acoustic source signal;

storing in the data memory information representing medium propagation properties selected from the group that includes velocity, density, and scattering properties;

storing in the data memory information representing the geometric relationship of the simulated positions of an acoustic source, an acoustic receiver, and the target;

storing in the data memory a class library including a target class having a plurality of methods, a highlight base class and one or more highlight subclasses each having a plurality of methods;

instantiating from the stored class library a target object representing the target;

instantiating from the stored class library a highlight object representing one or more of the target highlights; and executing a plurality of the methods in the target and highlight objects to predict the simulated acoustic received signal.

11. A system for simulating an acoustic received signal arising from an acoustic source signal scattered by a target having a plurality of highlights, the system comprising:

a data processor;

a user interface coupled to the data processor for accepting user commands and data;

a data memory coupled to the data processor for storing information and executable processor instructions, including information representing the properties of the acoustic source signal, information representing the geometric relationship of the simulated positions of an acoustic source, an acoustic receiver, and the target, information representing medium propagation properties selected from the group that includes velocity, density, and scattering properties;

a class library including a target class having a plurality of methods, a highlight base class and one or more highlight subclasses each having a plurality of methods, program means for instantiating from the stored class library a target object representing the target, program means for instantiating from the stored class library a highlight object representing one or more of the target highlights, and program means for executing a plurality of the methods in the target and highlight objects to predict the simulated acoustic received signal.

12. A computer program product for use with a system for simulating an acoustic received signal arising from an acoustic source signal scattered by a target having a plurality of highlights, the system including a data memory and a display device, the computer program product comprising:

a recording medium;

program means, recorded on the recording medium, for directing the system to store in the data memory information representing the properties of the acoustic source signal;

program means, recorded on the recording medium, for directing the system to store in the data memory information representing the geometric relationship of the simulated positions of an acoustic source, an acoustic receiver, and the target;

program means, recorded on the recording medium, for directing the system to store in the data memory information representing medium propagation properties selected from the group that includes velocity, density, and scattering properties;

program means, recorded on the recording medium, for directing the system to store in the data memory a class library including a target class having a plurality of methods, a highlight base class and one or more highlight subclasses each having a plurality of methods;

program means, recorded on the recording medium, for directing the system to instantiate from the stored class library a target object representing the target;

program means, recorded on the recording medium, for directing the system to instantiate from the stored class library a highlight object representing one or more of the target highlights; and program means, recorded on the recording medium, for directing the system to execute a plurality of the methods in the target and highlight objects to predict the simulated acoustic received signal.

* * * * *